July 4, 1950  A. F. JENNINGS  2,514,212
CONTROL LEVER FOR AIRCRAFT AND THE LIKE
Filed Aug. 25, 1948
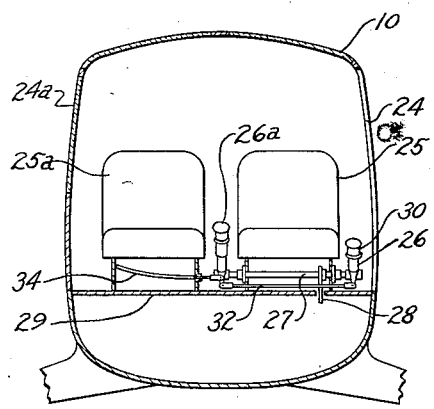
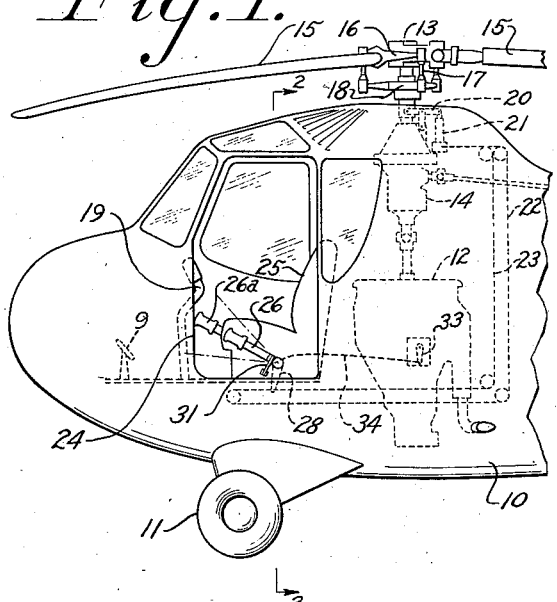
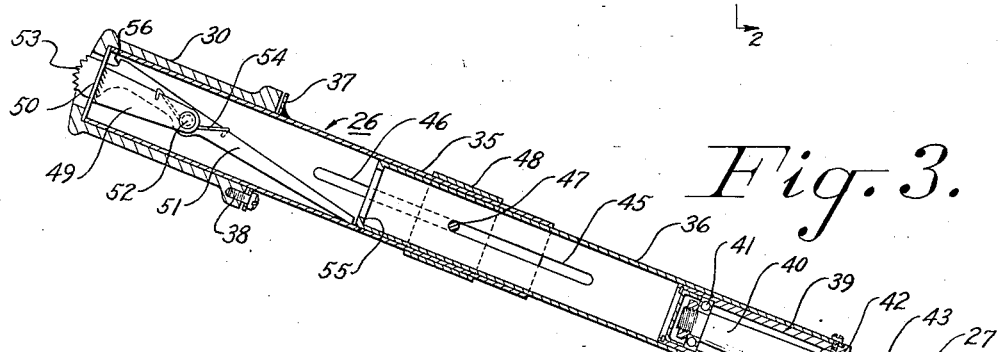
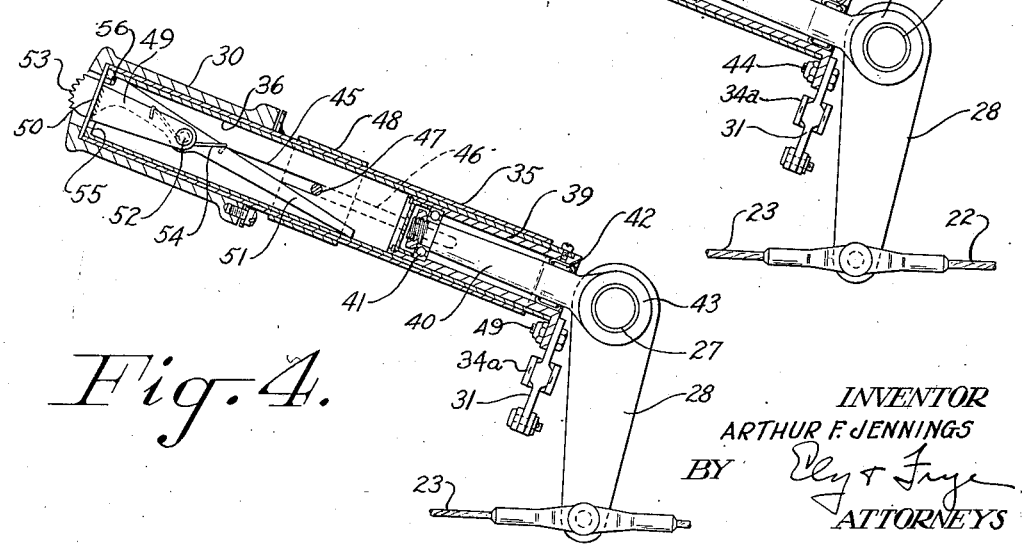
INVENTOR
ARTHUR F. JENNINGS
BY
ATTORNEYS Patented July 4, 1950

2,514,212

UNITED STATES PATENT OFFICE 2,514,212

CONTROL LEVER FOR AIRCRAFT AND THE LIKE

Arthur F. Jennings, Willow Grove, Pa., assignor to The Firestone Tire & Rubber Company, Akron, Ohio, a corporation of Ohio Application August 25, 1948, Serial No. 46,000

7 Claims. (Cl. 74—488)

This invention relates to controls for rotocraft and the like and is more particularly concerned with the construction of the operator's collective pitch control lever therefor.

In aircraft of this nature it is generally customary to provide rotors having the blades attached for pitch control movement. Cyclic variation of the pitch of the rotors may be used for longitudinal and lateral control of the aircraft, while collective pitch variation is used to increase or decrease the lift or thrust of the rotor according to the application of power. The cyclic variation is controlled from the normal pilot's flight control stick. The collective or simultaneous pitch is controlled by a separate lever which may be operated by the free hand of the operator while one hand is engaged in the normal flight control.

In view of the fact that both controls must at times be operated simultaneously, it is customary to provide the throttle control for the engine as a built-in part of the collective pitch control lever, the hand grip of the lever being arranged for rotation in a fashion which controls the engine throttle. In this manner the engine and rotor controls may be completely coordinated in any fashion required by the circumstances without the need of the operator removing his hands from any of the vital controls.

In aircraft of this sort it is often desirable to provide a side-by-side seating arrangement in which dual controls are supplied. In the more customary control arrangement the collective pitch lever is located to the left of the pilot so that he can operate the main flight controls with his right hand while controlling the collective pitch and the engine power with his left hand. With dual controls, therefore, a collective pitch lever is desirable at the left hand side of each seat. While some aircraft designs provide only a single pitch control lever between the two seats, such an arrangement necessitates operating the flight controls with the left hand when flying from the left hand seat. One of the reasons for omitting the outside lever is that the lever will normally obstruct the door and cause some difficulty in entering or leaving the cabin from the left hand side. The present invention is concerned with a lever construction which may be readily collapsed so that the pitch lever when not in use may be moved to a position where it will be out of the way. This collapsing arrangement for the pitch lever, therefore, permits ready access to either side from the outside and also permits changing position from one seat to the other without obstruction from the pitch lever.

One of the primary objects of the invention, therefore, is the construction of an operator's collective pitch control lever which includes not only the throttle control but a simple and reliable means for telescopically lengthening or shortening the control lever from normal extended operating position to a collapsed position.

Another object of the invention is to provide a collapsing lever construction of this nature which is fully operative in its collapsed position to either control rotor pitch or operate the engine throttle.

A further object of the invention is to provide a relatively foolproof and at the same time simple latch arrangement to prevent inadvertent collapsing of the lever.

Still another object of the invention is to provide an arrangement of parts for the latch and rotational transfer mechanism which will permit a maximum degree of telescoping action while still retaining a simple assembly arrangement.

How the foregoing and other objects and advantages of the invention are accomplished will be clear from the following description of the drawing in which—

Figure 1 is a side elevational view of the forward portion of a rotorcraft incorporating the present invention.

Figure 2 is a view of the cabin interior taken generally in the direction of arrows 2—2 in Figure 1.

Figure 3 is a sectional view to an enlarged scale of the operator's pitch control lever in extended position.

Figure 4 is a view similar to Fig. 3 but showing the control lever with the parts in collapsed position.

In Figures 1 and 2, the fuselage 10 is shown with forward landing wheels 11 for the support of aircraft on the ground. An engine 12 provides the power to drive the rotor hub 13 by means of the transmission system indicated at 14. Blades 15 are connected to the rotor hub 13 in a fashion which permits change of blade pitch with respect to the rotor hub. For this purpose an arm 16 is provided for each blade. Each arm 16 is connected by means of a push rod 17 to a swashplate unit indicated at 18. The swash-plate 18 may be connected by means of mechanism not shown to the pilot's control stick 19, in order to provide for lateral and longitudinal control of the aircraft. Collective pitch control of the rotor is effected by raising and lowering the swashplate 18 by means of a beam construction illustrated at 20 and operated by a screwjack 21 which may be rotated by control cables 22 and 23.

In the cabin portion of the fuselage 10, a door is provided at each side of the fuselage. The left hand door is shown removed to show the interior more clearly, the door opening being indicated at 24. The right hand door is indicated at 24a. Two cabin seats 25 and 25a are provided in side-by-side relationship. At the lower left hand side of each seat a control lever for the rotor collective pitch is located, the left hand lever being shown at 26 in collapsed position and the right hand lever 26a being shown in extended position. Levers 26 and 26a are supported on a cross-shaft 27 which is rotated when either of the levers is moved. Attached to the cross-shaft 27 is a depending lever 28 which extends through the floor 29 and is connected to cables 22 and 23 in a fashion which, as will be seen from Fig. 1, causes operation of the collective pitch upon swinging motion of the levers 26 and 26a. The normal range of motion of the collective pitch control lever is indicated in Fig. 1 by the broken lines.

Control of the engine throttle is accomplished by rotation of the hand-grip 30 of the control lever. This causes movement of a small lever 31 at the lower end of the control member. A push rod 32 connects the levers 26 and 26a so that they rotate in unison. A connection from the lever 31 attached to control member 26a extends to the engine carburetor lever 33. This connection is illustrated in the form of a push-pull cable assembly 34 connected to lever 31 at 34a (see Fig. 3).

Rudder pedals 9 are also illustrated in the cabin and these may be connected to the tail rotor not shown, to provide for directional control of the craft.

The details of construction of the control member 26 will be more clearly seen in Figs. 3 and 4. The control member 26 is made up of two tubular telescoping parts, the outer one of which is indicated by numeral 35 and the inner by numeral 36. The hand-grip 30 is securely connected to the outer tubular member 35 by means of flange 37 and screw 38. The inner tubular member 36 is connected to a bearing housing part 39 which in turn is mounted on spindle 40 by means of bearings 41 and 42, this construction providing for rigid support of the lever 26 and at the same time permitting free rotation for acurate throttling control. The spindle 40 is connected by means of collar 43 to the cross-shaft 27. It will further be observed that the throttle lever 31 is firmly connected to move with the external bearing support 39 by means of bolts as indicated at 44.

The telescoping action of parts 35 and 36 is controlled by an arrangement of slots in the two members which permits approximately twice the telescoping distance permitted by either slot individually. The slot in the internal member 36 is shown at 45 and the slot in the external member 35 is shown at 46. The proper relationship of the tubes and the limiting position for extension and retraction is controlled by a pin 47 which extends completely through the slotted members 35 and 36 and is carried by a floating sleeve 48. Floating sleeve 48 may move longitudinally with respect to outer tube 35, thereby permitting tube 35 to move not only the length of slot 46 but also the length of slot 45 to the completely collapsed position illustrated in Fig. 4. In this figure it will be seen that the pin 47 is moved from the upper end to the lower end of slot 45 and is moved from the lower end to the upper end of slot 46. This construction permits the outer tube 35 to be telescoped down almost to the lower end of inner tube 36 and the inner tube 36 to extend to the upper end of tube 35 while still permitting the use of the space inside the lower end of tube 36 for housing the spindle mounting and use of the space at the upper end of tube 35 for housing the latch parts.

The construction of the latch and its operation will be clear from Figs. 3 and 4. Inside the tube 35 a bracket structure 49 is firmly attached to the cap plate 50 which closes the upper end of the sleeve 15. A latch member 51 is supported in bracket 49 by means of pivot 52. The upper end of latch member 51 projects through the closure plate 50 as indicated at 53, the serrated end of the latch extending slightly beyond a slotted opening in the end of handle or grip 30. A suitable spring 54 causes the lower end of the latch part 51 to be urged toward the side of the tube 35. In the position illustrated in Figure 3, the lower end of latch member 51 will contact the flange 55 at the upper end of tubular member 36 and thus prevent telescoping action of the parts. Axial extension is prevented by the bolt 47 reacting against the ends of slots 45 and 46. When it is desired to collapse the stick to the position shown in Figure 4 the operator can move the latch member 51 by contacting the serrated end 53 with his thumb so that member 51 will clear the flange 55 and permit telescoping the handle to collapsed position. In fully collapsed position the end 55 of the inside tube extends close to the upper end of outer tube 35, and flange 55 engages behind a shoulder 56 on latch 51 to retain the parts in collapsed position. For extending the parts, shoulder 56 is released from flange 55 by pressure on end 53 of the latch.

With this construction for the collective control lever proper throttle operation may be obtained whether the lever is in extended or collapsed position because of the interconnection between the two parts of the lever at all times by means of the slotted arrangement. This slotted arrangement, with its cooperating floating collar, further provides for an unusual amount of collapsing action while still permitting space for the rotational mounting at the lower end and the latch mechanism at the upper end. The placing of the handle grip on the larger size tube further assists in permitting the greatest amount of collapsing with the minimum of collapsed length, since the outer tube may completely encompass the inner tube which extends inside the handle with adequate clearance. The collapsing lever construction as disclosed permits complete and easy access to either seat or a change from one seat to the other without interference. At the same time it permits full advantage to be taken of the increased mechanical advantage developed by the longer lever. When a passenger is carried it is an obvious advantage to have the center pitch control lever in collapsed position where it will be out of the way between the seats. To prepare for dual instruction work the lever may be immediately moved to extended position.

I claim:

1. In a helicopter collective pitch control system of the type having a lever pivoted at its lower end for fore and aft movement, a pivotal part including a spindle, a lower tubular member supported on said spindle and arranged for rotational movement with respect thereto, an outer tubular member adapted to fit over said lower tubular member and telescope therewith, and interconnecting means between said tubular members arranged to permit telescoping action but prevent rotational movement therebetween.

2. For a helicopter, an operator's pitch control member, a support therefor, said member having a hand grip and adapted to be moved to and fro on said support for pitch control, a throttle control actuatable by rotational movement of said hand grip, said member being constructed with telescoping parts in a fashion to permit changing the effective length of the member, said support incorporating structure for transmitting the rotational movement of said grip to said throttle control in all positions of said member.

3. For an aircraft control system, an operator's lever incorporating a lower tubular portion mounted for swinging motion, an upper tubular portion proportioned to telescope over said lower portion, and a latch supported in the upper portion having a part adapted to contact the upper end of said lower portion when the lever is in extended position, said latch having a part extending through the upper end of the lever and actuatable to move said part out of contact with the upper end of the lower portion thereby permitting the lever to be collapsed.

4. A collapsible aircraft control lever including a pair of telescoping tubes, the outer tube incorporating the handle of the lever, each of the tubes having a longitudinal slot therein, a collar around the outer tube, and an elongated member supported by said collar, said member extending through the slots in both tubes.

5. For a helicopter pitch control lever incorporating an engine throttle control, a pair of telescoping tubes, an internal spindle on which the inner tube is mounted at its lower end for rotational movement, a handle member on the upper end of the outer tube, at least one of said tubes incorporating a slot, and a member engaging said slot in a fashion to permit longitudinal sliding motion of said tubes while transmitting rotational motion therebetween.

6. A helicopter pitch control lever incorporating a pair of telescoping tubular members, a spindle mounting structure mounted inside the lower end of the inner member, a hand grip on the upper end of the outer member, and a latch located inside the upper end of the outer member, in the path of collapse of the inner, tubular member, whereby it holds the telescoping members in extended position, but is movable to permit collapse thereof, and means on the latch and inner tubular member, co-acting to hold the latter in collapsed position.

7. A helicopter pitch control lever incorporating a pair of telescoping tubular members, a supporting structure located inside the lower end of the inner member, a cap on the upper end of the outer member, and a latch supported on said cap and extending into the outer member a distance approximately equal to the telescoping motion, the latch lying in the path of collapse of the inner tubular member whereby it is inside the inner member when the lever is in collapsed position, and means on the latch and inner tubular member co-acting to hold the latter in collapsed condition.

ARTHUR F. JENNINGS.

REFERENCES CITED

The following references are of record in the file of this patent:

UNITED STATES PATENTS

| Number | Name | Date |
|---|---|---|
| 210,669 | Coates | Dec. 10, 1878 |
| 524,522 | Bourne | Aug. 14, 1894 |
| 1,232,449 | Mellin | July 3, 1917 |
| 1,819,111 | Neal | Aug. 18, 1931 |

FOREIGN PATENTS

| Number | Country | Date |
|---|---|---|
| 292,301 | Great Britain | June 21, 1928 |